Jan. 27, 1925.  1,524,118

C. D. TURNAGE

COTTON STALK PULLER

Filed March 7, 1924    2 Sheets-Sheet 1

Jan. 27, 1925. 1,524,118
C. D. TURNAGE
COTTON STALK PULLER
Filed March 7, 1924 2 Sheets-Sheet 2

C. D. Turnage,
Inventor

By Clarence A. O'Brien
Attorney

Patented Jan. 27, 1925.

1,524,118

UNITED STATES PATENT OFFICE.

CHARLES D. TURNAGE, OF FOXWORTH, MISSISSIPPI.

COTTON-STALK PULLER.

Application filed March 7, 1924. Serial No. 697,518.

*To all whom it may concern:*

Be it known that I, CHARLES D. TURNAGE, a citizen of the United States, residing at Foxworth, in the county of Marion and State of Mississippi, have invented certain new and useful Improvements in Cotton-Stalk Pullers, of which the following is a specification.

This invention relates to new and useful improvements in agricultural machines and is principally adapted for use in removing cotton stalks so as to destroy the boll weevils which have become lodged thereon.

Another important object of the present invention is to provide a cotton stalk puller of the above mentioned character, wherein means are provided for easily pulling the stalks out of the ground, means being associated therewith for feeding the stalks to the pulling means.

A still further object of the present invention is to provide a cotton stalk puller of the above mentioned character, of the wheeled type wherein the pulling means for removing the cotton stalks from the ground are operated by the wheels of the device as the same moves along the rows of growing cotton stalks.

A further object of the invention is to provide a cotton stalk puller of the above mentioned character, which is simple in construction, inexpensive, strong and durable, and further well adapted for the purposes for which it is designated.

Other objects and advantages of this invention will become apparent during the course of the following description.

In the accompanying drawings forming a part of this specification, and in which like numerals designate like parts throughout the same:

Figure 4 is a vertical sectional view of one of the guide sleeves and a pulling roller associated therewith.

Figure 1:
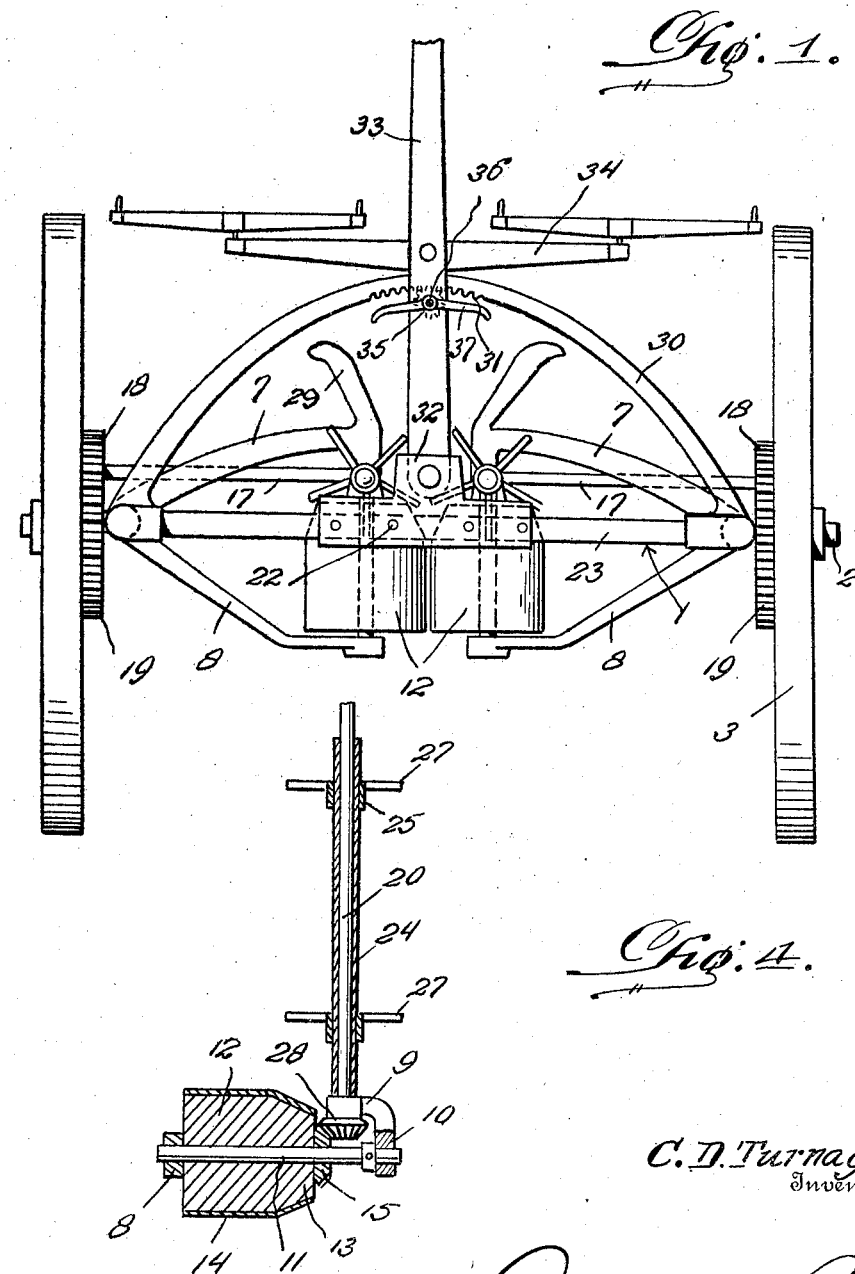
Figure 1 is a top plan view of my invention.

In the drawings wherein for the purpose of illustration is shown the preferred embodiment of my invention, the numeral 1 designates an arched axle, the lower free ends of which extend outwardly as shown at 2 in the drawings for the purpose of supporting the traction wheels 3 thereon. Supported by the lower portions of the vertical arms 5 of the arched axle 1 and extending inwardly therefrom are the supporting frames or brackets 6. As each bracket is of substantially the same construction, the description of one is thought to suffice for the description of both.

Figure 2:
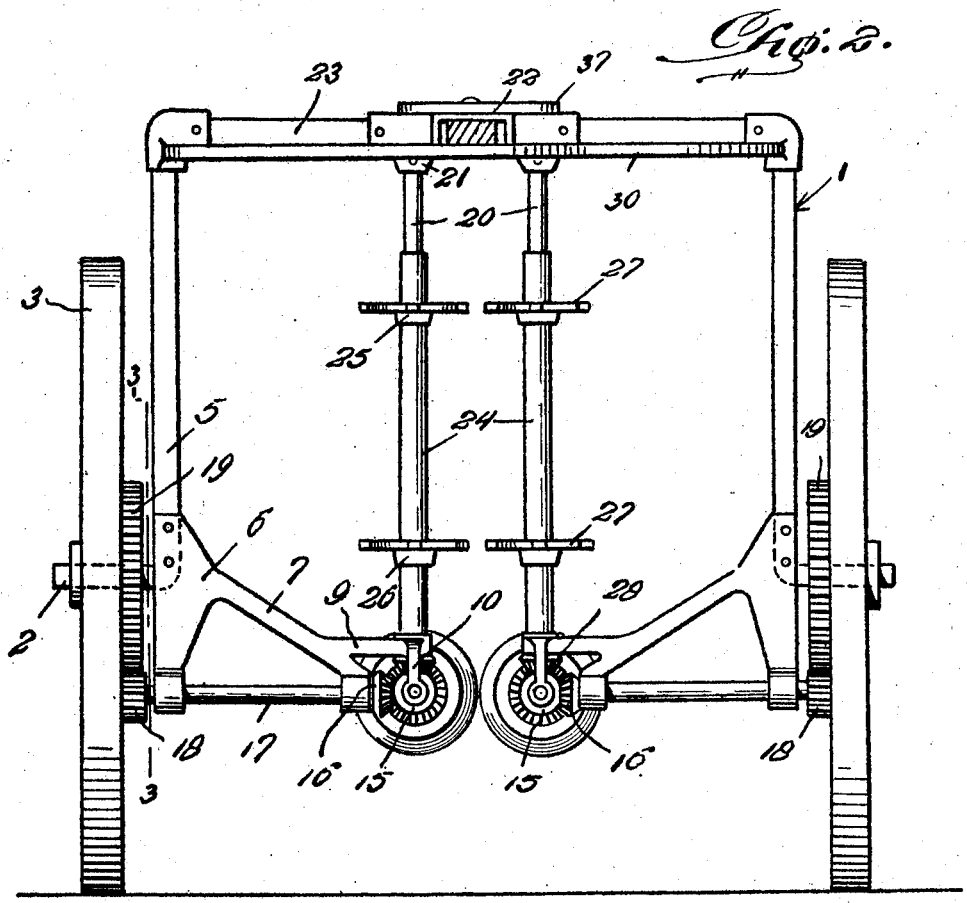
Figure 2 is a rear end elevation thereof.
Figure 3:
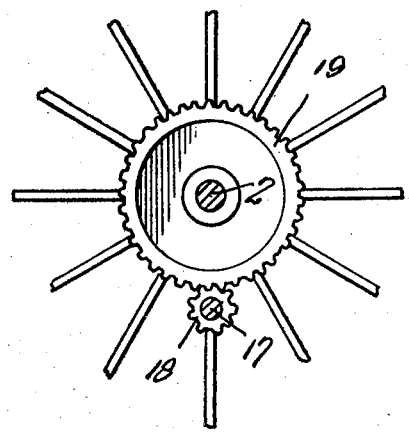
Figure 3 is a vertical section taken on the line 3—3 of Figure 2.

Extending forwardly and rearwardly from the brackets 6 and diverging therefrom are the arms 7 and 8 respectively. These arms extend substantially from the upper portion of each bracket and downwardly therefrom in the manner as clearly shown in Figure 2 of the drawings. The inner arm 7 of each bracket is provided with a lateral extension 9 and the latter has a depending portion 10 provided at the outer free end thereof. The lower portion of the depending member 10 of each arm 7 is enlarged and provided with a suitable aperture adapted to register with a similar aperture provided in the outer end of the corresponding arm 8 and this construction provides a means for supporting therebetween the horizontally extending shafts 11. Mounted on the shafts 11 adjacent the arms 8 are the pulling rollers 12 adapted for cooperation. The forward ends of the rollers 12 are tapered as shown at 13 in the drawings and a suitable rubber covering or the like is adapted to be placed over each roller 12 and as indicated at 14. When in position on the shafts 11 between the outer free ends of the diverging arms 7 and 8 respectively, the rollers 12 will be so arranged as to coact with each other in the manner as will be presently described.

Keyed to each shaft 11 adjacent the tapered portion 13 of each roller 12 is a bevelled gear 15. This bevelled gear 15 is adapted to mesh with a similar bevelled gear 16 carried by the inner end of the shaft 17 which is journalled in the lower extension of the arm 7 and the body portion of the bracket 6 respectively, in the manner as clearly shown in Figure 2 of the drawings. The opposite end of the shaft 17 carries thereon the pinion 18 which is adapted to mesh with the gear wheel 19 keyed to the extensions 2 formed on the lower portions of the arched axle 1 whereby rotary movement to the shaft 17 and to the rollers 12 will be imparted through the medium of the traction wheels 3, when the machine is in operation.

Supported in the outer end of each of the extensions 9 formed on the arms 7 and extending vertically therefrom are the shafts 20. The upper ends of the shafts 20 are journalled in the depending portions 21 formed in the bracket 22 which is clamped around the horizontally extending portion 23 of the axle 1. Adapted to be supported on each of the vertical shafts 20, are the tubular elongated sleeves 24 and mounted adjacent the upper and lower ends thereof respectively, are the collars 25 and 26, each of which is provided with the radiating arms 27 whereby spiders are formed on the sleeves 24. The sleeves 24 are furthermore held in position on the shafts 20 in any suitable manner and for the purpose of rotating the shafts and the sleeves carried thereby, I provide the lower ends of the shafts with the bevelled gears 28, each of which is adapted to mesh with the bevelled gear 15 carried by the horizontally extending shaft 11 on which is mounted the pulling roller 12.

The spider formed on the tubular sleeve 24 in the manner as above described, will provide a guide means for engagement with the upper portions of the cotton stalks whereby the latter may be held in such a position as to enable the gripping rollers to efficiently remove the stalks from tne ground. It is to be understood that the spiders are rotated in the opposite direction as are also the pulling rollers 12 and the means for operating the pulling rollers will also simultaneously cause the rotation of the spiders through the medium of the shaft upon which the same are mounted. The outer ends of the arms 7 are also provided with laterally extending portions 29 which extend forwardly of the shaft 20 and provide a means for initially engaging the cotton stalks so that the spiders which are supported directly in front of the gripping rollers 12 will engage the same.

Extending from the upper ends of the vertical portions 5 of the arched axle 1 is the cross beam 30 and the same is substantially arcuate shaped as is clearly illustrated in Figure 1 of the drawings. The central portion of the arcuate shaped cross beam 30 has teeth 31 formed on the inner face thereof for the purpose to be presently described.

The bracket 22 which is supported on the horizontally extending portion 23 of the arched axle 1, is also provided with a lateral extension 32 which extends forwardly and provides a means for pivotally supporting the inner end of the draft tongue 33. This draft tongue 33 extends forwardly of the arched axle 1 and is adapted to be supported on the intermediate portion of the arcuate shaped cross beam 30 and the usual doubletree or whiffletree such as is shown at 34 in the drawings, is carried by the forward end of the tongue 33 for the purposes well known in the art.

Adapted to cooperate with the teeth 31 formed on the cross beam 30 is the ratchet wheel 35 and the latter is suitably supported on the under face of the draft tongue 33. The upper portion of the shaft 36 which supports the ratchet wheel 35 extends through the top of the draft tongue 33 and is also adapted to support thereon the foot operating lever 37, the purpose of which is to provide a means for causing the rotation of the ratchet wheel 35 whereby the traction wheels 3 may be caused to turn in either direction at the will of the operator.

The operation of my improved cotton stalk puller may be briefly stated as follows. With the parts arranged as shown in the drawings, the device is adapted to be placed over the rows of the stalks which are to be removed and as the vehicle moves along the ground, the traction wheels 3 will cause the simultaneous rotation of the pulling rollers 12 and the spiders 27 which feed the stalks to the rollers and the reverse rotation of the rollers will cause the stalks to be pulled upwardly out of the ground. After all of the stalks have been removed from the ground, the same may be collected together in any suitable manner and then destroyed so as to exterminate the boll weevils or the like which have become lodged in the stalks.

The simplicity of my device enables the same to be easily and efficiently operated and does not require the use of any sort of external power in order to provide for the operation of the several parts thereof.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

1. A stalk puller comprising an arched axle, traction wheels on the outer ends thereof, supporting brackets mounted on the lower portions of said axle, each of said brackets having arms diverging therefrom and extending inwardly, horizontal shafts journalled in the outer ends of the diverging arms of said brackets, pulling rollers carried by said shafts and adapted to rotate in opposite directions, and vertically extending guide means disposed between a portion of said arched axle and one of the arms of each of said brackets, and means for actuating said rollers and guide means simultaneously.

2. A stalk puller comprising an arched axle, traction wheels on the outer ends thereof, brackets mounted on the lower portions of said axle and extending inwardly therefrom, horizontally arranged coacting rollers journalled in the inner opposed ends of said brackets, vertical shafts having their upper ends journalled in a bracket carried by the upper portion of said arched axle, the lower ends of said shafts extending through the inner opposed ends of said brackets, spiders mounted on said shafts adjacent the upper and lower ends thereof respectively, said shafts being arranged directly in front of said rollers, the spiders forming guide means for feeding the stalks to the rollers, and means for actuating said rollers and said shafts in opposite directions simultaneously.

3. A stalk puller comprising an arched axle, traction wheels on the outer ends thereof, supporting brackets carried by the lower portions of said axle, each of said brackets having arms diverging therefrom and extending inwardly, horizontally arranged pulling rollers journalled in the inner opposed ends of said arms, bevelled gears associated with said rollers, shafts journalled in said brackets and having bevelled gears adapted to mesh with the before mentioned bevelled gears at one end and having pinions on the opposite end thereof for engagement with the gear wheels carried by said traction wheels, whereby said rollers are adapted to be rotated in opposite directions, and rotatable guide means for feeding the stalks to said rollers, arranged directly in front of said rollers and adapted to be actuated thereby.

In testimony whereof I affix my signature.

CHARLES D. TURNAGE.